United States Patent
Levitan

(10) Patent No.: US 6,698,023 B2
(45) Date of Patent: Feb. 24, 2004

(54) INTERNET ACCESS VIA ONE-WAY TELEVISION CHANNELS

(75) Inventor: Gutman Levitan, Stamford, CT (US)

(73) Assignee: Virtel Corporation, Stamford, CT (US)

( * ) Notice: Subject to any disclaimer, the term of this patent is extended or adjusted under 35 U.S.C. 154(b) by 0 days.

(21) Appl. No.: 09/179,375

(22) Filed: Oct. 26, 1998

(65) Prior Publication Data

US 2002/0069413 A1 Jun. 6, 2002

(51) Int. Cl.$^7$ .............................................. H04N 7/173
(52) U.S. Cl. .......................... 725/135; 725/51; 725/54
(58) Field of Search ................................ 709/217, 219; 345/327; 348/12, 13, 10, 6, 906; 485/5.1, 6.1, 6.2, 6.3; 725/46, 47, 45, 44, 51, 38, 119, 139, 141, 136; H04N 5/445, 7/16, 7/173; G06F 3/00, 13/00

(56) References Cited

U.S. PATENT DOCUMENTS

| | | | | |
|---|---|---|---|---|
| 5,818,441 A | * | 10/1998 | Throckmorton et al. | .... 725/110 |
| 5,889,950 A | * | 3/1999 | Kuzma | ......................... 725/37 |
| 6,018,359 A | * | 1/2000 | Kermode et al. | ........... 709/719 |
| 6,018,768 A | * | 1/2000 | Ullman et al. | ............... 709/218 |
| 6,058,421 A | * | 5/2000 | Fijolek et al. | ............... 709/217 |
| 6,075,568 A | * | 6/2000 | Matsuura | ..................... 348/478 |
| 6,108,706 A | * | 8/2000 | Birdwell et al. | ............ 709/217 |
| 6,308,328 B1 | * | 10/2001 | Bowcutt et al. | ............. 725/111 |
| 6,356,311 B1 | * | 3/2002 | Matsumoto et al. | ........ 348/461 |

* cited by examiner

Primary Examiner—Vivek Srivastava
(74) Attorney, Agent, or Firm—I. Zborovsky

(57) ABSTRACT

A system using one-way TV channels to provide access to Internet content which, unlike e-mail, is not intended for a particular person but rather for an audience. An Internet server at a television transmission center downloads Web pages from Internet sites and retransmits them via a television network in broadcast manner to simultaneously reach unlimited number of client computers. The server supplies client computers in advance with a timetable listing each Web page scheduled for transmission along with time and channel of the transmission so that client computers, having their individual selection lists, could automatically download pages of interest. The system completely eliminates waiting time downloading Web pages of user's choice whenever they are updated and instantly presents the pages on request providing television quality of images, audio and video. In addition, the system facilitates integration of television and Internet advertising.

3 Claims, 3 Drawing Sheets

INTERNET ACCESS VIA ONE-WAY TELEVISION CHANNELS

BACKGROUND OF THE INVENTION

This invention relates to information technology for Internet and presents an alternative way for delivery of Internet content from Web sites. It does not exclude the delivery via telephone but rather supplements it where appropriate. Most of content stored on Web sites is created for promotion of products, services or ideas, and therefore intended for an audience rather than a particular person. And while by its nature the content is intended for broadcast, in current Internet it is delivered individually to each user like mail and phone calls. The result is congestion on routers and servers, and user wastes his time waiting until a page will be downloaded in his computer.

The present invention is an information technology providing Internet access through conventional one-way television channels. The technology eliminates waiting time, facilitates television quality of images, audio and video, and takes away from Internet switched circuits the heaviest traffic preserving their resources for two-way addressable communications such as orders, bills, chats and videoconferences. Initially the technology was developed for television itself in order to take television out of prime time limits and help viewers to deal with uneasy choice among 100 channels currently available in cable and satellite networks. U.S. Pat. No 5,534,911 by the same applicant describes an apparatus for providing a customer of a television system with virtual personal channel that being selected delivers television programs of the most personal interest no matter on which channel and at what time the programs are physically transmitted. The technology facilitates fine-tuned personalized services based on automatic selection and recording of television programs transmitted via one-way channels in broadcast manner. In pending application Ser. No 08/881,934 by the same applicant the concept of virtual personal channel is applied to advertisement in order to provide a new type of advertising, commercial-on-demand, which, in turn, is incorporated with Internet to facilitate a highly automated home shopping system-virtual personal store. In this application, the technology of automatic selection and recording is further developed for delivery of content from Web sources.

There are currently two major developments in the intersection of television and Internet: Internet TV and cable modem. Internet TV provides TV viewers with Internet access via set-top computers. It supposed to be cheaper because the set-top computer doesn't need a monitor, using TV screen instead. It seems like a spoon that is also a fork on the other end: savings may or may not outweigh inconveniences. However Internet TV has developed hardware, software and services that may be of a great value for future integration of Internet and television. Philips Consumer Electronics, Sony Electronics and Mitsubishi Consumer Electronics of America are manufacturing WebTV, a set-top box based on technology developed by WebTV Networks, a unit of Microsoft. RCA division of Thomson Consumer Electronics introduced another set-top box based on design from Network Computer, Inc., a unit of Oracle Corp. NetChannel Inc., South San Francisco, provides Internet services for the RCA product. Internet TV by itself doesn't address major Internet problems: long waiting time and superficial search engines retrieving too many useless materials.

The other development, cable modem, is intended to provide high-speed Internet access via cable television lines. While standard modems connected to telephone lines have rate 28.8 to 56 kb/s, cable line can provide a speed up to 27 Mb/s. The most successful project in the field is @Home, Mountain View, Calif., sponsored by TCI, the largest cable TV company. Deployment of cable modems necessitates an expensive conversion of conventional one-way cable TV network into two-way addressable network. In addition, cable modem eliminates only one Internet bottleneck, so called "last mile connection" while there are others. With explosive grows of the number of Internet users, congestion on routers and servers contributes to the annoying waiting time as well especially at rush ours of prime time. And even on local level, Internet users equipped with cable modem share limited resources allocated to their cable neighborhood node.

The common feature of the referred prior art is delivery of all Internet content, including news, entertainment and advertisement, in the usual for current Internet way, i.e. via two-way addressable network. Meanwhile nonaddressable one-way broadcast and two-way addressable service are different and equally important parts of any mature communication infrastructure. On one side we see newspapers, magazines, radio and television, on other—mail, telephone, facsimile and videoconferences. Those two types of communications are fundamentally different not as much in technology as in domain. While broadcast media dominates in delivery of news, entertainment and advertisement, two-way addressable media supports personal communications and transactions. Switching media domains, whatever innovative it seems to be in theory, looks as media misuse in practice.

As to Internet, its hardware gets faster but number of users grows explosively. Therefore slow connection is a secondary problem, the primary one is the number of recipients served simultaneously. In any addressable system each recipient needs a separate communication and/or computing resource for the time of connection, and therefore only limited number of recipients can be served simultaneously. In a nonaddressable broadcast system all recipients are connected (tuned) to the same channel and thus there is no technical limit for the number of recipients. This fundamental difference between addressable and nonaddressable media will exist forever and neither digital compression nor cable modem can eliminate it.

SUMMARY OF THE INVENTION

Accordingly, it is an object of the present invention to provide a system delivering Internet content via one-way television channels. An Internet server at a television transmission center downloads Web pages from Web sites and retransmits them in broadcast manner through a television network to simultaneously reach unlimited number of recipients. The server supplies client computers in advance with a timetable file listing all Web pages scheduled for transmission along with time/channel and other data necessary for reception of those pages at the time of their transmission. Client computers are connected to the television network and store individual selection lists of Web pages. The system delivers Web pages to interested and if necessary, authorized users completely eliminating waiting time and providing television quality of images, audio and video. In addition, it takes away from Internet switched circuits the heaviest traffic preserving their resources for two-way addressable communications such as orders, bills, chats and videoconferences.

Another object is a system providing similar service for PC users not connected to a television network but to Internet only. The system delivers Internet content to the users via a one-way TV network and intermediate Internet servers connected to the network. Each server stores selection lists of a group of local PC users and downloads Web pages included in at least one of those selection lists. The size of each served group is limited so to avoid congestion.

A further object of the invention is to provide a powerful, highly automated search engine matching data about Web pages included in the timetable file with data about user's interests stored in client computer.

A still further object is integration of television and Internet advertising. At transmitting end, the system adds Web page data to television signal carrying a conventional TV commercial. At receiving end, it displays a message on TV screen prompting viewer to order additional information when TV signal contains the data, and then adds the Web page to viewer's selection list if viewer positively responds to the message. As a result the page will be automatically downloaded at the time of its transmission and presented later on viewer's request.

BRIEF DESCRIPTION OF THE DRAWING FIGURES

DESCRIPTION OF THE PREFERRED EMBODIMENTS

Figure 1:
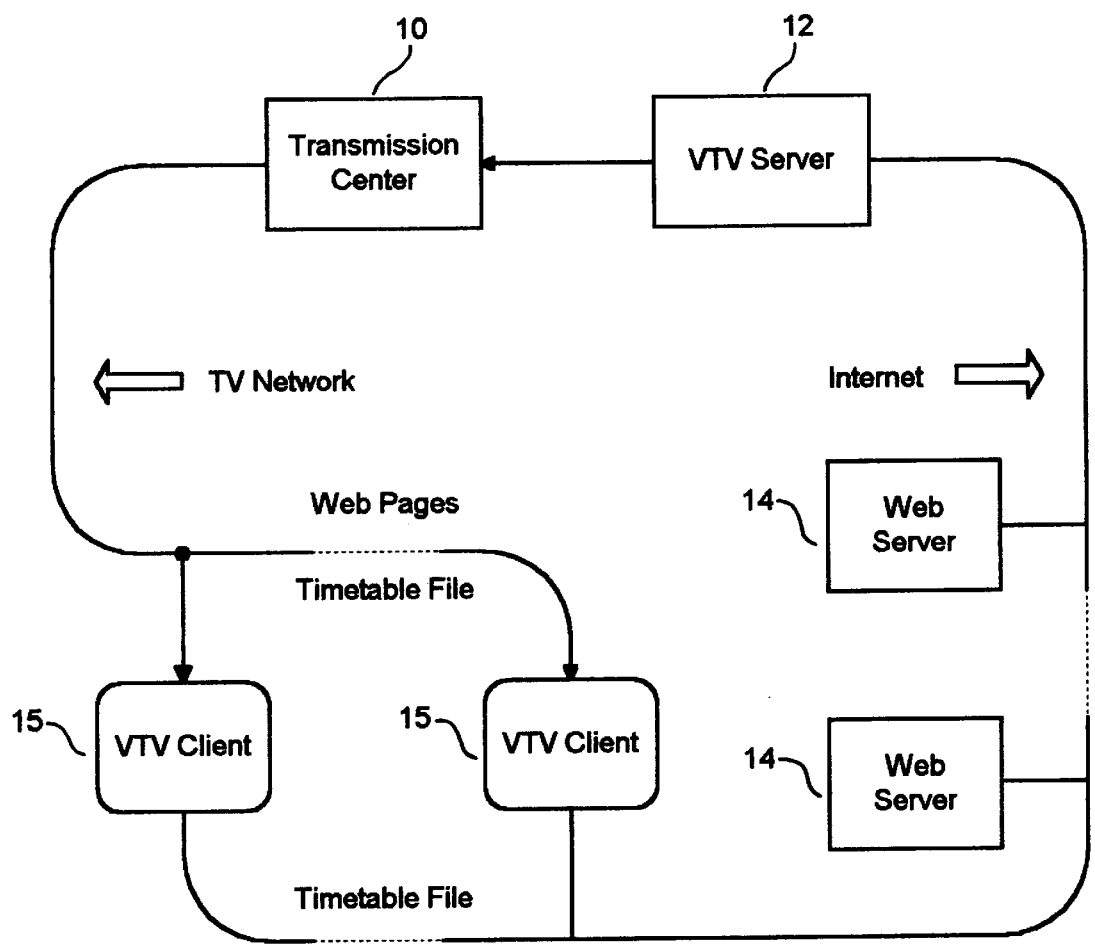
FIG. 1 is a block diagram of a system for Internet access via one-way TV channels.

A block diagram of the system providing Internet access via one-way TV channels is shown on FIG. 1. At the transmitting end it consists of a television transmission center 10 and an Internet server 12 associated with the television center. To distinguish the server as provider of virtual television broadcast from Web sites, it is referred herein as VTV Server. The VTV Server downloads Web pages from Web Servers 14 connected to Internet world wide, and then retransmits the pages via a television network in broadcast manner to simultaneously reach unlimited number of client computers 15 referred herein a's VTV Clients.

A one-way transmission medium shown on FIG. 1 as TV Network may be "air" (over-the-air transmission), coaxial or fiber cable, satellite, microwave relay stations, cellular network or any combination of them. One standard TV channel transmits 30 full-screen pictures per second, 2.5 million pictures a day. If the channel will transmit pages with still picture and text at the same rate, then a cable or satellite company having 100 channels can transmit 250 million Web pages daily. It is enough to retransmit virtually each page on the World Wide Web whenever the page is updated.

A VTV Client 15 may be a PC, or so called set-top, that is a computer put on the top of a TV set to display Web pages on TV screen. Or it may be a computer built in a TV set to run this and other applications. It may also be a PC Theater, i.e. a big-screen computer with a tuner card. What is important, it is a computer connected to both Internet and a television network.

The VTV Server supplies VTV Clients in advance with a timetable listing each Web page scheduled for transmission along with time, channel and other access data so that Clients, having their individual selection lists, could download pages of interest at the time of their transmission. The downloading does not require user's participation and as a result can take place at any time. On the other hand, whenever user wants to see a page included in his selection list the page is already downloaded in his computer and therefore presented instantly, without annoying waiting time and frustrating rejections. Note that it doesn't matter how Web pages are downloaded in a computer: they still have links to jump to other pages inside or outside of the computer. The difference is that the internal jump is instant while the external one involves downloading via Internet switched circuits and therefore causes usual delays.

Now let see how the system eliminates traffic jams on the Internet bottlenecks. First, a popular site may experience millions of "hits" daily and when it gets too busy, additional requests are rejected to avoid excessive delays. In the system illustrated by FIG. 1, only one computer, the VTV Server 12, contacts Web sites on servers 14 and therefore no congestion could happen. Accordingly, a single transfer to VTV Server replaces multiple transmissions to many Internet users. Second, transmission of Web pages via TV network bypasses Internet routers and makes the pages simultaneously available to all VTV Clients 15 connected to the TV network. Third, downloading Web pages in client computers is an automatic process, it does not require user's participation and as a result, can take place at any time including late night and business hours. And fourth, the "last mile" of delivery is covered by a cable or a satellite dish, not by slow phone line.

Another benefit of the technology is television quality of picture and sound. On Internet all files carrying images, audio and video are compressed to make their transfer faster and thereby avoid excessive delays in downloading. Generally, the more compression, the faster transfer and the worth picture. As soon as delay is not an issue any more the compression can be limited to a level where it does not sacrifice resolution. The quality is very important for Internet commerce. And it seems that this time a delivery of audio and video from Internet sources is going to be practical.

Timetable file is composed in VTV Server and delivered to VTV Clients via TV network or Internet prior to transmission of Web pages listed in the file. Access data for Web pages intended for authorized users only may not be included in the timetable file transmitted in broadcast manner, so timetable of those pages is distributed via e-mail to authorized clients accordingly to an authorization list. The timetable does not contain graphics, audio or video and therefore its transmission does not clog the Internet. Web pages themselves may be encrypted and decryption key included in their access data. Another key-based protection technique is disclosed in U.S. Pat. No 5,280,497 by the same applicant. The patent presents access control by frequent pseudorandom redistribution of different transmissions (TV channels) among available physical channels. In this case encryption of Web pages is not necessary because the transmission system itself takes care about security. However a pseudorandomly hopping signal can also be encrypted and the combination of two protections would create a deadlock for attacker because any of the two protections cannot be even attacked before the other is defeated.

Figure 2:
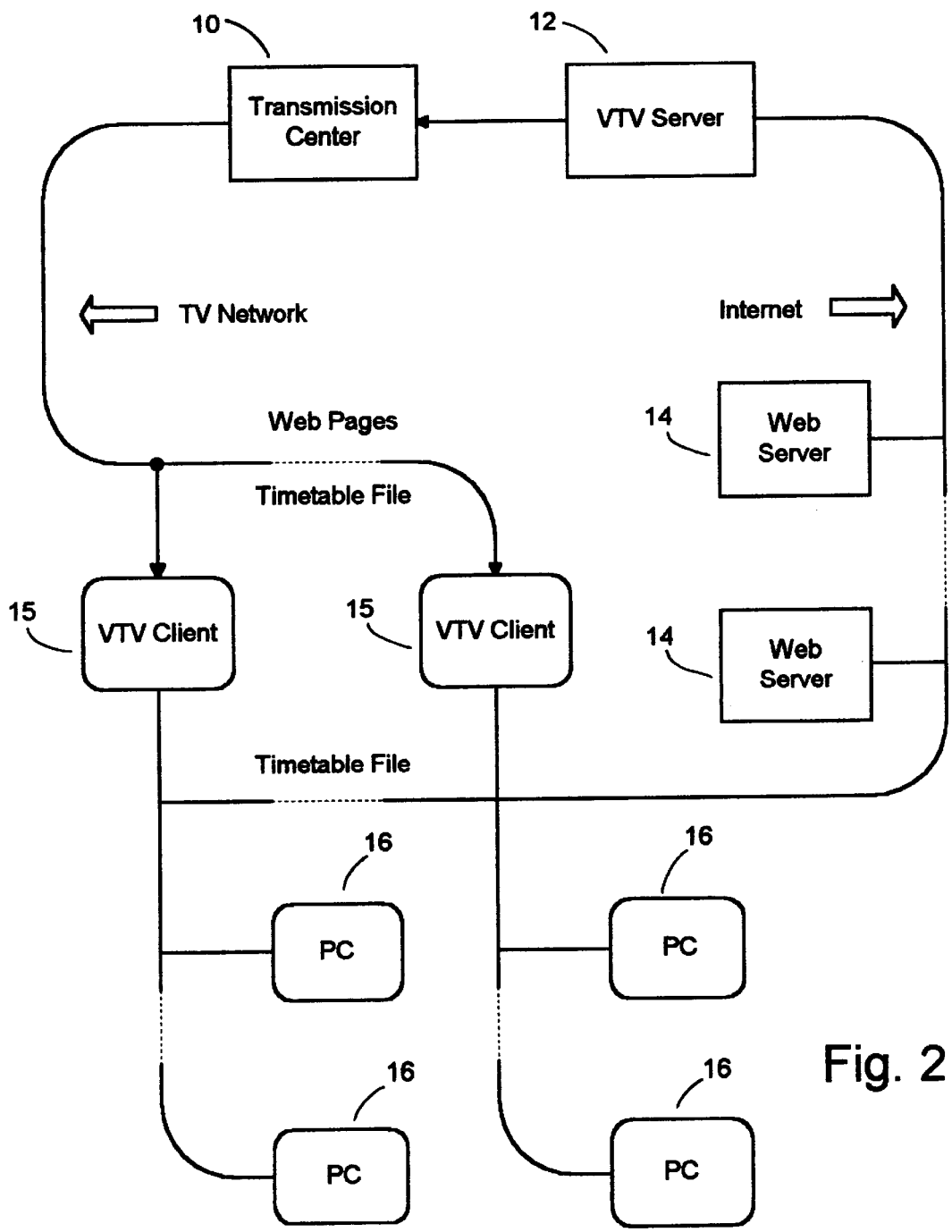
FIG. 2 is a block diagram of a system for delivery of Internet content to groups of PC users via intermediate servers connected to a TV network.

FIG. 2 illustrates a system providing some benefits of Internet access via TV channels to Internet users whose personal computers, PC 16, are not connected directly to a television network. The system delivers Internet content to the users via a one-way TV network and VTV Clients 15 operating as intermediate servers for groups of PC users. Each server stores selection lists of a group of local PC users and downloads Web pages included in at least one of those selection lists. The size of each group can be limited so to avoid congestion. For PC user the system operation looks like any other Internet service and no additional wiring for TV connection is required. The PC itself does not need a large hard drive because it relies on hard drive of its server. It could even be not PC but so called NT—a cheap network computer without hard drive. The system however provides less privacy and will be slow in delivery of video.

Now let return to FIG. 1. When VTV Client combines features of computer and TV set the system facilitates a complete integration of television and Internet. It can not only deliver news and entertainment from both television and Internet sources, but also supplement conventional TV commercials with information from Internet. For example, the law prohibits advertising of prescription drugs without complete list of warnings and restrictions. A commercial, which typically occupies TV screen for 30 seconds, just can't afford it. The system of FIG. 1 can resolve the problem connecting a short commercial to information stored on a Web site without interruption of television program within which the commercial is running. At transmitting end, the system adds Web page data in vertical retrace interval of television signal carrying the conventional TV commercial. At receiving end, it displays a message on TV screen prompting viewer to order additional information when TV signal contains the data, and then adds the Web page to viewer's selection list if viewer positively responds to the message. As a result the page will be automatically downloaded at the time of its transmission and presented later on viewer's request.

Figure 3:
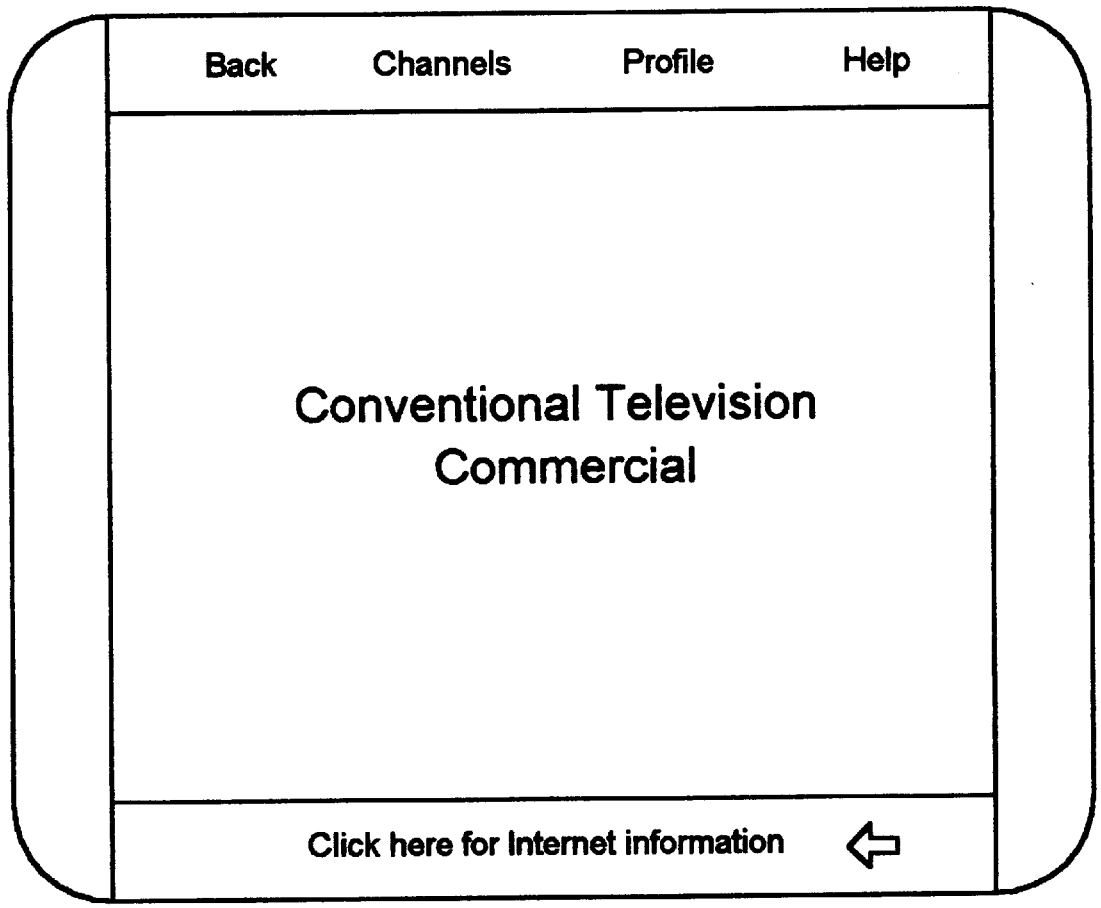
FIG. 3 shows a layout of a window connecting TV commercials to related Internet sources.

Implementation of the feature requires a computer window, accepting viewer's response, being shown on TV screen simultaneously with running TV commercial. A one decision is using for this purpose picture-in-picture capability available in some TV sets. Another decision is running TV commercial within a computer window—the technology developed by WebTV Networks, unit of Microsoft, and implemented in its WebTV Plus product. FIG. 3 shows a layout of a window running TV commercial and displaying a message prompting viewer to click for information from Internet sources.

Internet users compose their selection lists of Web pages in all possible ways including usage of Internet search engines such as Yahoo, AltaVista, Excite, Infoseek and others. The engines look for a specified keyword in a free text primarily intended for human attention, not for computer analysis. As a result the search is superficial, it brings a lot of useless material and can easily skip what you really want. This invention relies on other approach to selection process developed earlier in referred above technology of virtual personal channels. The approach makes difference between material intended for human attention and data intended for computer analysis. In particular, timetable file contains data specially created for automatic processing and that makes user's participation in downloading process unnecessary.

The system of this invention facilitates precise and highly automated selection of Web pages of the most personal interest for user. VTV Server 12 stores records about Web pages in a database. When a page is scheduled for transmission its record is retrieved, supplemented with time/channel and other access data, and included in the timetable file sent to VTV Clients 15. Each client computer stores user's profile data presenting user's interests and preferences. The client computer compares Web page data with user's profile and adds to user's selection list those Web pages whose content matches user's interests.

While certain novel features of this invention have been shown and described and are pointed out in the annexed claims, it will be understood that various omissions, substitutions and changes in the forms and details of the devices illustrated and their operation can be made by those skilled in the art without departing from the spirit of the invention. In particular, the one-way nonaddressable transmission medium is not necessarily television, it could be radio or any other communication system.

I claim:

1. A system for reducing Internet traffic and speeding up users' access to Internet content and applications, comprising:

a one-way multichannel communication medium;

a multichannel data transmitter at a transmission center connected to the one-way multichannel communication medium;

a broadcast server located at the transmission center and connected to the multichannel data transmitter for transmitting data in a broadcast manner and further connected to the Internet for downloading select Internet files from Internet servers located anywhere in the world and transmitting the downloaded files over said multichannel data transmitter in order to simultaneously reach an unlimited number of recipients served by the transmission center, said broadcast server operative for maintaining a selection list of Internet files to be transmitted in broadcast manner, downloading an entire file of the selection list from its origin Internet server before transmission of that file over said muiltichannel data transmitter, storing each downloaded file at least as long as to the end of its broadcast transmission, scheduling downloaded files for broadcast transmission in such a way to evenly distribute data flows among channels of said multichannel data transmitter and thereby to efficiently utilize the bandwidth of the channels, maintaining a timetable of broadcast transmission listing each Internet file scheduled for a transmission together with a time and a channel of the transmission, transmitting the timetable over a channel of said multichannel data transmitter prior to any Internet file listed in the timetable and transmitting each Internet file listed in the timetable over said multichannel data transmitter at the time and on the channel specified in the timetable;

at the recipient side, a channel selector connected to said one-way multichannel communication medium;

client means coupled to the channel selector for receiving said timetable of broadcast transmission from the channel over which the timetable is transmitted and for selective receiving of Internet flies from channels specified in the timetable, said client means storing a user's selection list of Internet files for processing said timetable against the user's selection list, identifying Internet files present in both the user's selection list and the timetable, controlling said channel selector for automatic downloading the identified files at the time and from the channels of their broadcast transmissions as specified in the timetable, and replacing, if necessary, previous versions of the files by new versions; and display means coupled to said client means for presenting any of the downloaded Internet files to user on user's request at the time of user's choice.

2. A system as defined in claim 1; and further comprising end-user computers where said client means is an intermediate server for a group of the end-user computers connected to the intermediate server via a two-way addressable network, said intermediate server storing individual selection lists of end-users for downloading Internet files transmitted over said one-way multichannel communication medium and included in at least one individual selection list.

3. A system as defined in claim 1, wherein said one-way multichannel communication medium is a television network.

* * * * *